(12) United States Patent
Dudar et al.

(10) Patent No.: US 8,551,214 B2
(45) Date of Patent: Oct. 8, 2013

(54) FUEL SYSTEM DIAGNOSTICS

(75) Inventors: Aed Mohammad Dudar, Canton, MI (US); Robert Roy Jentz, Westland, MI (US); Mark W. Peters, Wolverine Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 232 days.

(21) Appl. No.: 13/043,157

(22) Filed: Mar. 8, 2011

(65) Prior Publication Data

US 2012/0227580 A1 Sep. 13, 2012

(51) Int. Cl.
*B01D 53/02* (2006.01)

(52) U.S. Cl.
USPC ...... 95/19; 95/273; 95/284; 55/310; 123/516; 123/518; 123/519; 123/520; 123/521; 73/40; 73/40.5 R; 73/114.39

(58) Field of Classification Search
USPC ............... 95/19, 273, 284; 55/310; 123/516, 123/518–521; 73/40, 40.5 R, 114.39
See application file for complete search history.

(56) References Cited

U.S. PATENT DOCUMENTS

| | | | | |
|---|---|---|---|---|
| 4,918,968 | A * | 4/1990 | Hoffman | 73/40 |
| 5,092,158 | A * | 3/1992 | Tuma et al. | 73/1.05 |
| 5,575,265 | A | 11/1996 | Kurihara et al. | |
| 5,635,630 | A * | 6/1997 | Dawson et al. | 73/40.5 R |
| 5,699,775 | A | 12/1997 | Azuma | |
| 5,890,474 | A * | 4/1999 | Schnaibel et al. | 123/520 |
| 6,964,193 | B2 | 11/2005 | Kobayashi et al. | |
| 7,137,293 | B2 * | 11/2006 | Sakagami et al. | 73/114.39 |
| 7,284,530 | B2 | 10/2007 | Nagasaki et al. | |
| 7,500,474 | B2 * | 3/2009 | Kano et al. | 123/520 |
| 7,805,259 | B2 * | 9/2010 | Furuse | 702/35 |
| 8,033,271 | B2 * | 10/2011 | Yoshimura | 123/520 |
| 8,342,157 | B2 * | 1/2013 | Der Manuelian et al. | 123/521 |
| 2004/0149016 | A1 * | 8/2004 | Kano et al. | 73/40 |
| 2008/0092858 | A1 * | 4/2008 | Satoh et al. | 123/520 |

\* cited by examiner

*Primary Examiner* — Christopher P Jones
(74) *Attorney, Agent, or Firm* — Julia Voutyras; Alleman Hall McCoy Russell & Tuttle LLP (57) ABSTRACT

An emissions control system is provided that comprises a fuel tank, a hydrocarbon filter element, and a three-way valve coupled between the hydrocarbon filter element and the atmosphere. The three-way valve is comprised of three ports, a purge port, a reference port, and a sealed port, and enables identification of degradation of the emissions control system. The arrangement of the ports on the valve enables a simplified testing method that reduces background errors caused by transitioning between various operating positions.

16 Claims, 6 Drawing Sheets

FUEL SYSTEM DIAGNOSTICS

FIELD

The present description relates to systems and methods for identifying degradation in an emissions control system.

BACKGROUND AND SUMMARY

Vehicles may be fitted with evaporative emission control systems to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system allows the vapors to be purged into the engine intake manifold for use as fuel. However, leaks in the emissions control system can inadvertently allow fuel vapor to escape to the atmosphere. Thus, various approaches are used to identify such leaks.

One example leak detection method is described in U.S. Pat. No. 5,575,265. Here, a valve containing a reference orifice is utilized to determine the pressure or vacuum of the fuel system in the presence of a small leak, such as the EPA standard 0.5 mm. The pressure or vacuum determined while the system is closed can then be compared to that obtained with the reference orifice in the system.

However, the inventors herein have recognized a problem with the above approach. Even when a known reference leak is used in the system, vacuum or pressure can be affected by the movement of the various valves that couple the known leak into the system. Furthermore, even when the known leak can be used in the system, the variation in the vacuum or pressure generated relative to atmosphere can may not be sufficiently equalized with atmosphere between obtaining the reference and test signals, thus masking differences in pressure or vacuum between the two and increasing the chance of an erroneous determination.

Thus, in one example, the above issue may be addressed by a system comprising a vapor line coupling a tank to a hydrocarbon filter, a vent line between the hydrocarbon filter and atmosphere, and a three-way valve in the vent line between an ambient filter and the hydrocarbon filter. The valve has a neutral spool position coupling the hydrocarbon filter with atmosphere, a reference spool position coupling the hydrocarbon filter with atmosphere, and a test spool position opposite of the reference position blocking atmosphere from the hydrocarbon filter.

In this manner, the three ports needed to operate the fuel recovery system in purge, storage, reference, and test modes can all be arranged on one valve. Furthermore, the arrangement of the ports allows for a simplified testing strategy that equalizes the pressure in the system back to atmospheric between each reference and testing activity. Therefore, control issues and background noise introduced by transitioning between the various positions can be minimized.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
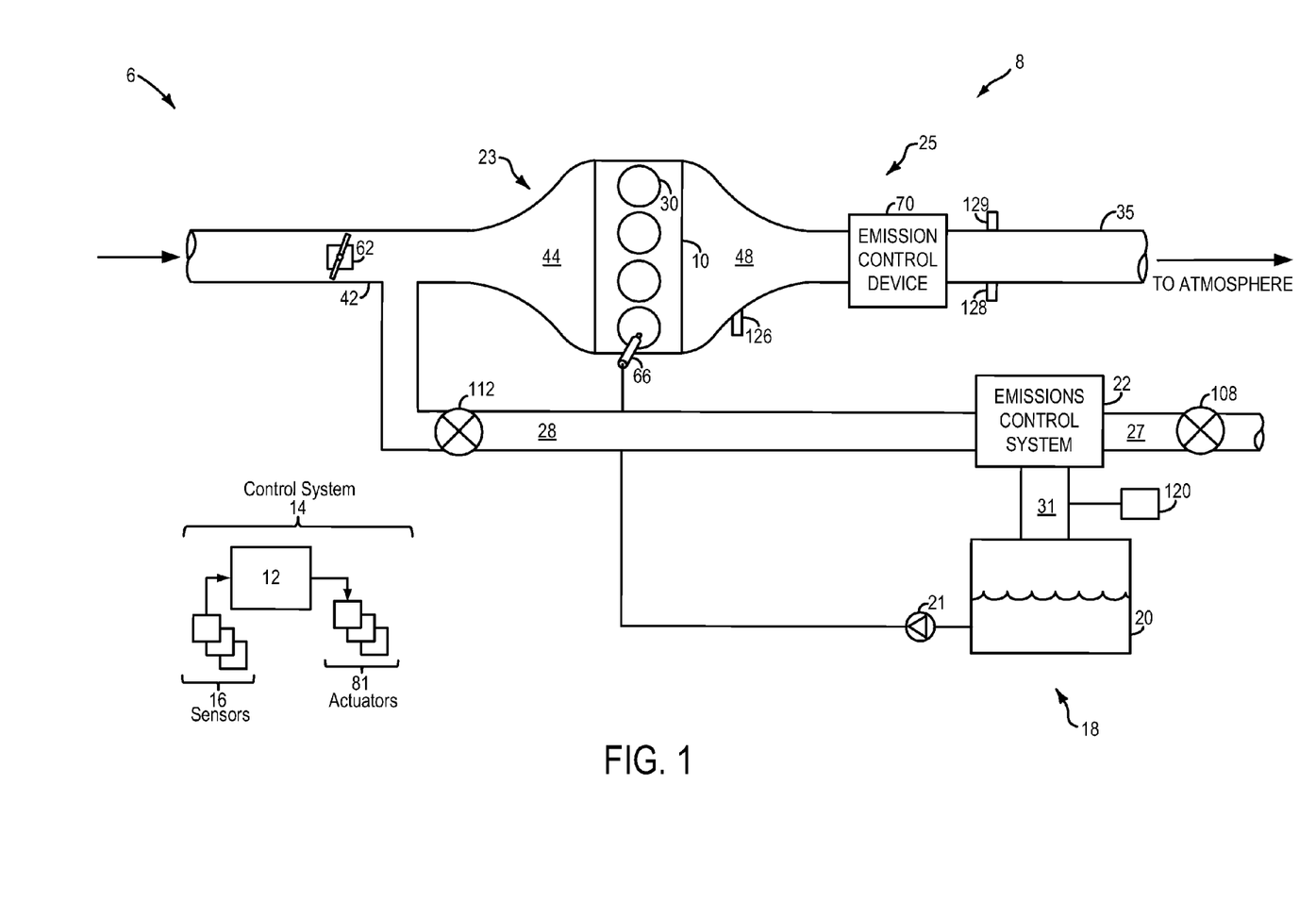
FIG. 1 shows a schematic depiction of an engine and an associated emissions control system.

FIG. 1 shows a schematic depiction of a vehicle system 6. The vehicle system 6 includes an engine system 8 coupled to an emissions control system 22 and a fuel system 18. The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices 70, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors, as further elaborated in the example embodiments of FIGS. 2-5.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It will be appreciated that fuel system 18 may be a return-less fuel system, a return fuel system, or various other types of fuel system. Vapors generated in fuel system 18 may be routed to an emissions control system 22, described further below, via vapor recovery line 31, before being purged to the engine intake 23. Vapor recovery line 31 may optionally include a fuel tank isolation valve. Among other functions, fuel tank isolation valve may allow a fuel vapor canister of the emissions control system to be maintained at a low pressure or vacuum without increasing the fuel evaporation rate from the tank (which would otherwise occur if the fuel tank pressure were lowered). A fuel tank pressure transducer (FTPT) 120, or fuel tank pressure sensor, may be included between the fuel tank 20 and emissions control system 22, to provide an estimate of a fuel tank pressure, and for engine-off leak detection. The fuel tank pressure transducer may alternately be located in vapor recovery line 31, purge line 28, vent line 27, or emissions control system 22, without affecting its engine-off leak detection ability.

Emissions control system 22 may include one or more emissions control devices, such as one or more fuel vapor canisters filled with an appropriate adsorbent, the canisters configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 22 may further include a vent line 27 which may route gases out of the control system 22 to the atmosphere when storing, or trapping, fuel vapors from fuel system 18. Vent line 27 may also allow fresh air to be drawn into emissions control system 22 when purging stored fuel vapors from fuel system 18 to engine intake 23 via purge line 28 and purge valve 112. A canister check valve 116 may also be included in purge line 28 to prevent (boosted) intake manifold pressure from flowing gases into the purge line in the reverse direction. While this example shows vent line 27 communicating with fresh, unheated air, various modifications may also be used. Flow of air and vapors between emissions control system 22 and the atmosphere may be regulated by the operation of a canister vent solenoid (not shown), coupled to canister vent valve 108. A detailed system configuration of emissions control system 22 is described herein below with regard to FIGS. 2-5, including various additional components that may be included in the intake, exhaust, and fuel system.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as pressure, temperature, air/fuel ratio, and composition sensors may be coupled to various locations in the vehicle system 6, as discussed in more detail herein. As another example, the actuators may include fuel injector 66, valve 112, and throttle 62. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 6A and 6B.

Emissions control system 22 operates to store vaporized hydrocarbons (HCs) from fuel system 18. Under some operating conditions, such as during refueling, fuel vapors present in the fuel tank may be displaced when liquid is added to the tank. The displaced air and/or fuel vapors may be routed from the fuel tank 20 to the emissions control system 22, and then to the atmosphere through vent line 27. In this way, an increased amount of vaporized HCs may be stored in emissions control system 22. During a later engine operation, the stored vapors may be released back into the incoming air charge using the intake manifold vacuum. Specifically, the emissions control system 22 may draw fresh air through vent line 27 and purge stored HCs into the engine intake for combustion in the engine. Such purging operation may occur during selected engine operating conditions as described herein.

FIGS. 2-5 depict alternate embodiments of emissions control system 22. It will be appreciated that like numbered components introduced in one embodiment may be referenced similarly in other embodiments and may not be reintroduced for reasons of brevity.

Figure 2:
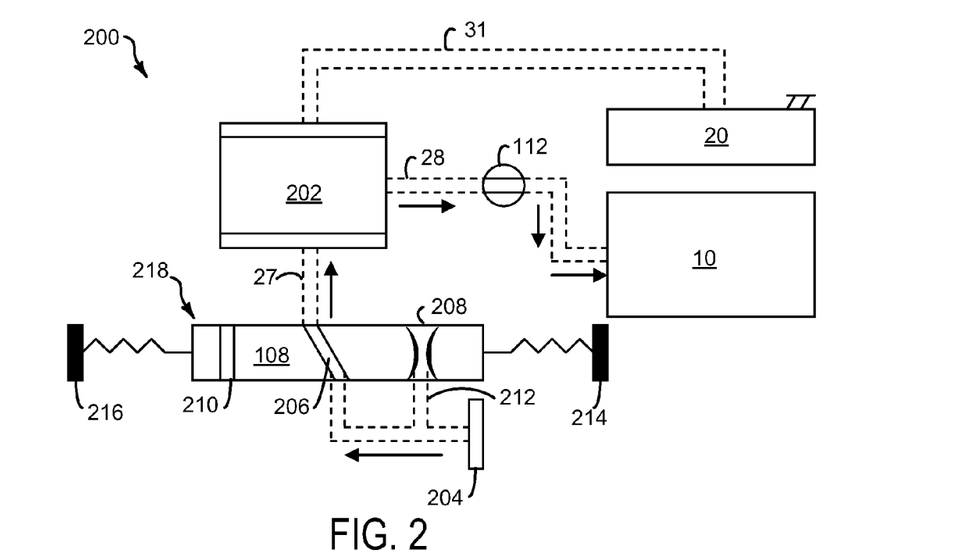
FIGS. 2-5 show the emissions control system of FIG. 1 in various operating modes.

FIG. 2 shows an example operating mode 200 of emissions control system 22. Emissions control system 22 may include one or more of a hydrocarbon filter element to retain fuel vapors, such as a fuel vapor canister 202. Canister 202 may be filled with an adsorbent capable of binding large quantities of vaporized HCs. In one example, the adsorbent used is activated charcoal. Canister 202 may receive fuel vapors from fuel tank 20 through vapor recovery line 31. While the depicted example shows a single canister, it will be appreciated that in alternate embodiments, a plurality of such canisters may be connected together.

Emissions control system 22 may communicate with the atmosphere through vent line 27. Canister vent valve 108 may be located along vent line 27, coupled between the fuel vapor canister and the atmosphere, and may adjust flow of air and vapors between emissions control system 22 and the atmosphere. Canister vent valve 108 is a three-way valve spool comprised of three ports, a first purge port 206, a second reference port 208, and a third sealed port 210, each of which can be coupled to canister 202 and two of which, the purge and reference ports, can be coupled to fresh air filter 204. The purge port 206 is positioned intermediate to the sealed port 210 and the reference port 208. Canister vent valve 108 also includes two coils 214 and 216 that, when energized, place the valve into its non-default operating positions, which will described in more detail with regard to FIGS. 3 and 4. Operation of the canister vent valve 108 may be regulated by a canister vent solenoid (not shown). Based on desired operating mode, the canister vent valve may be in one of a plurality of positions.

FIG. 2 depicts the default, non-energized operating position 218, when the canister vent solenoid is at rest and the canister vent valve 108 is open, fluidically coupling the canister 202 to the atmosphere via the first port, or the purge port, 206, which is located intermediate to the sealed port 210 and the reference port 208. In one example, during a purging operation (for example, during a canister regeneration and while the engine is running), the canister vent solenoid may be de-energized and the canister vent valve may be opened to allow a flow of fresh ambient air to strip the stored vapors of the activated charcoal, as depicted by arrows in FIG. 2. In this mode, the engine is running and fresh air flows through vent line 27 after passing through a fresh air filter 204. The purge valve 112 is open and air flows through the canister 202 and into the intake manifold to be combusted in engine 10.

Figure 3:
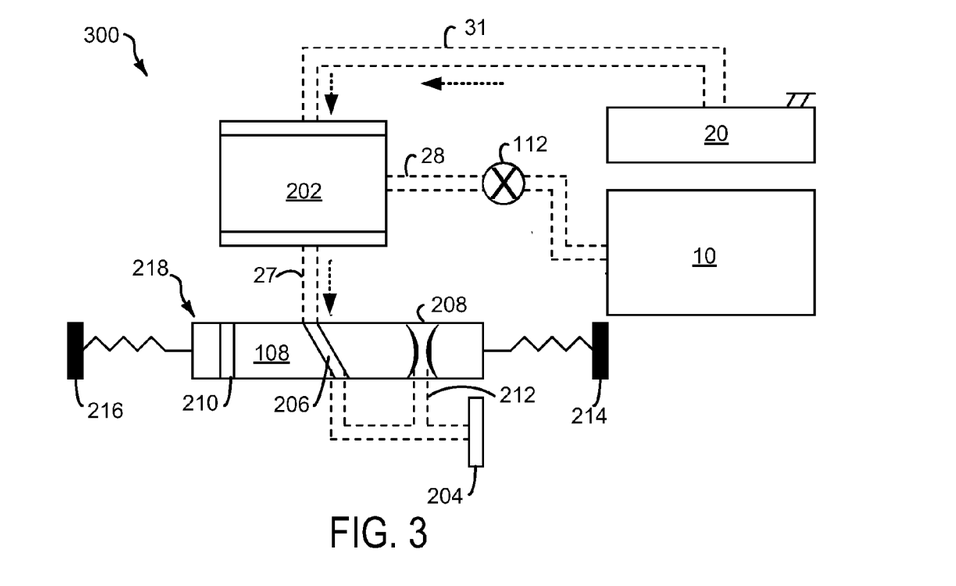

FIG. 3 depicts the emissions control system 22 of FIG. 2 operating in an alternate operating mode 300. In this mode, the purge valve 112 is closed and the engine is not running. The canister is fluidically coupled to the atmosphere through the purge port 206 of the valve, which is in its first operating position 218. Because the purge valve is closed and the engine is not running, the vapors accumulated in the canister are not purged to the engine. Rather, the vapors are either routed to the atmosphere, or are stored in the emissions control and fuel systems, depending on the relative level of pressure of the systems compared to the atmosphere. For example, the solid arrows indicate fresh air moving through the purge port of the valve from the atmosphere, after passing through the fresh air filter 204. This occurs when pressure inside the fuel and emission control systems is less than atmospheric pressure. Pressure lower than atmospheric can occur following key-off, when fuel vapors that were generated during engine operation begin to condense as the fuel tank cools. Alternatively, pressure lower than atmosphere may be generated by an external vacuum-generating device, such as a pump.

In another example indicated by the dashed arrows, fuel vapors from the fuel system move from the canister to the atmosphere through the purge port of the valve. This fuel vapor storage operation occurs, for example, during a fuel tank refilling and while the engine is not running. This results in air that is stripped of fuel vapor after passing through the canister being pushed out to the atmosphere. The vapors move in this manner when pressure inside the fuel and emission control systems is greater than atmospheric pressure. Pressure greater than atmospheric can occur when fuel in the fuel tank evaporates as a result of heat generated by operation of the engine being rejected into the fuel tank, which can occur immediately following key-off. Pressure can also be generated externally by a pressure-generating device, such as a pump.

Figure 4:
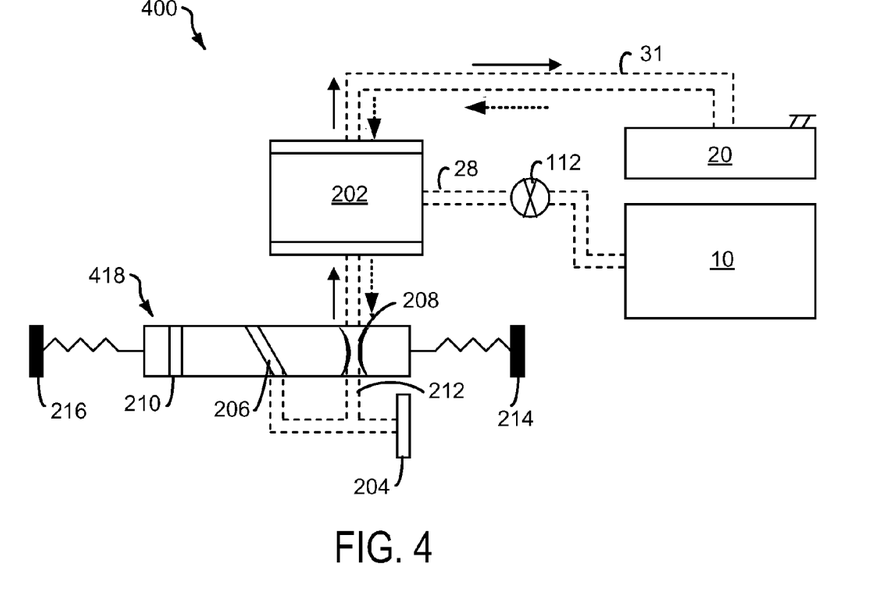

FIG. 4 depicts the canister vent valve 108 in a further alternate operating mode 400. In this embodiment, the canister vent valve 108 is in its reference position 418. To transition from the neutral position to the reference position 418, the valve spool linearly slides in a first direction away from the purge port 206 to the reference port 208. The valve is coupled to a first coil 214 to apply a force to move the valve from the neutral position 218 to the reference position 418 due to the first coil 214 being energized. As a result, the valve is in its second operating position 418 and the reference port 208 is fluidically coupled to the canister 202 via vent line 27 and to the fresh air filter 204 via vent line 27a. The reference port nearly seals the fuel system off from the atmosphere, except the port contains a small reference orifice to simulate a leak in the fuel system. In this embodiment, the reference orifice is 0.5 mm, corresponding to current EPA fuel system leak allowance. However, in other embodiments, the orifice could be another size, such as 0.4 mm. An orifice of any suitable size is within the scope of this disclosure. As described above in reference to FIG. 3, either fresh air from the atmosphere or vapors from the fuel system can move through the valve, dependent upon the level of pressure in the fuel and emission control systems. The solid arrows indicate movement of air from the atmosphere through the valve to the canister and fuel tank that results when pressure in the fuel system is less than atmospheric. The dashed arrows indicate vapors from the fuel system moving from the canister through the valve to the atmosphere as a result of pressure in the fuel system being greater than atmospheric.

The valve may be operated in the reference position 418 to obtain a reference pressure value, sensed by a pressure sensor such as pressure sensor 120 described in respect to FIG. 1, to be used as a dynamically detected threshold amount for determining if a leak in the emissions control system is present, as will be described in FIGS. 6A and 6B. The valve can be returned to its default operating position by de-energizing coil 214, causing the valve to linearly slide back to the default position 218.

Figure 5:
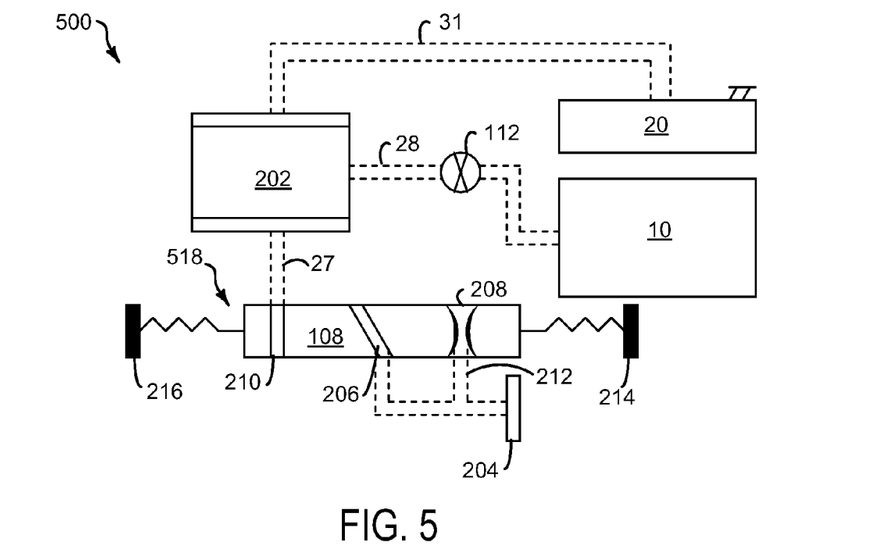

FIG. 5 shows the valve in another operating mode 500. The canister vent valve 108 is in its test position 518. To transition from the neutral position to the test position 518, the valve spool linearly slides in a second, opposite direction away from the purge port 206 to the test port 210. The valve is coupled to a second coil 216 to apply a force to move the valve from the neutral position 218 to the test position 518 due to the second coil 216 being energized. As a result, the sealed port 210 is fluidically coupled to the canister 202 via vent line 27, and the fuel system is sealed off from the atmosphere. Because the fuel system is sealed off from the atmosphere, no fresh air or vapors move through the valve.

The valve may be operated in the test position 518 to obtain a detected system pressure value, which is sensed by a pressure sensor and can be compared to the reference value obtained while the valve is in the reference position 418. The valve can be returned to its default position by de-energizing coil 216.

Figure 6A:
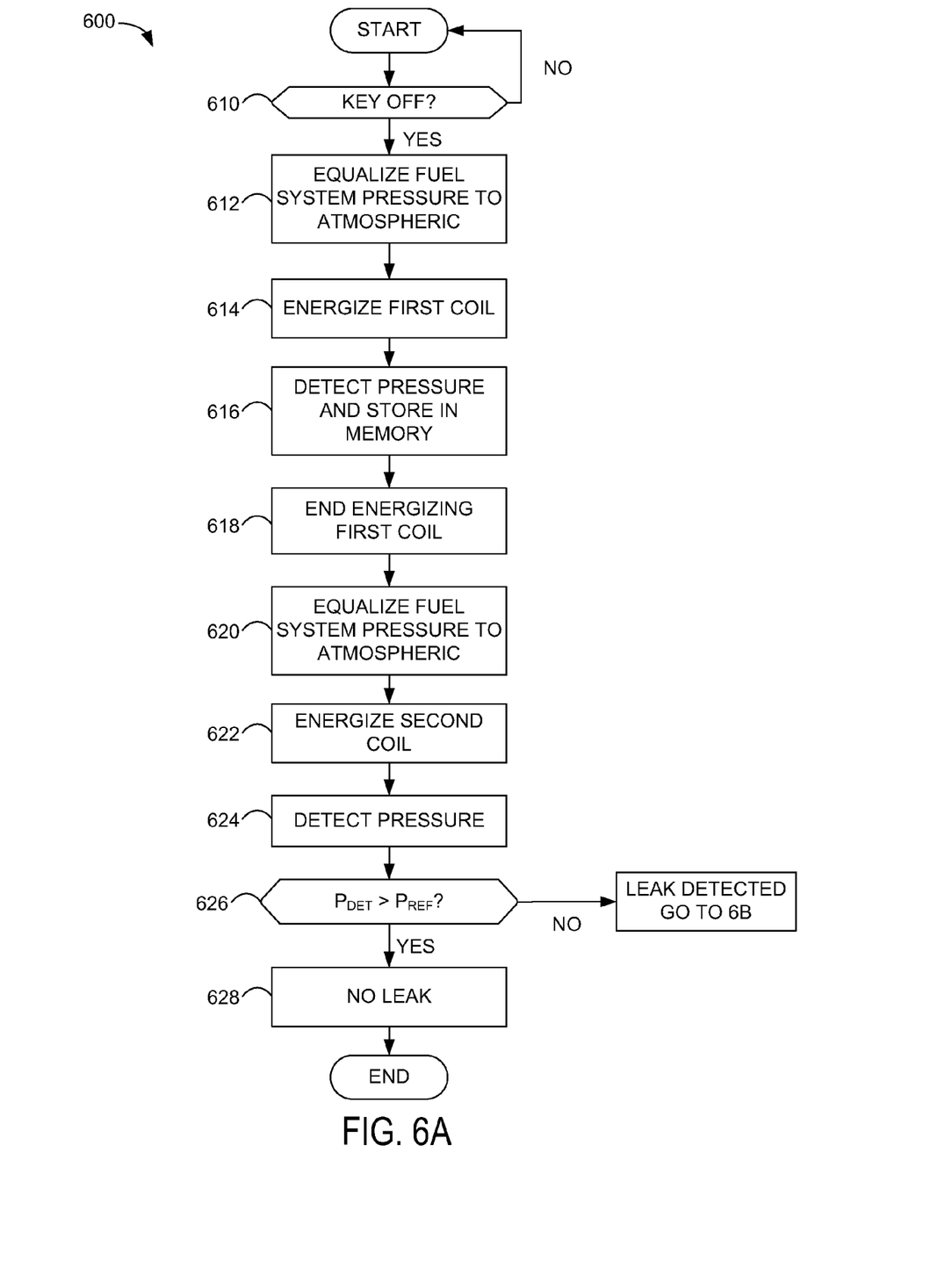
FIG. 6A depicts an example leak detection method according to an embodiment of the present disclosure.
Figure 6B:
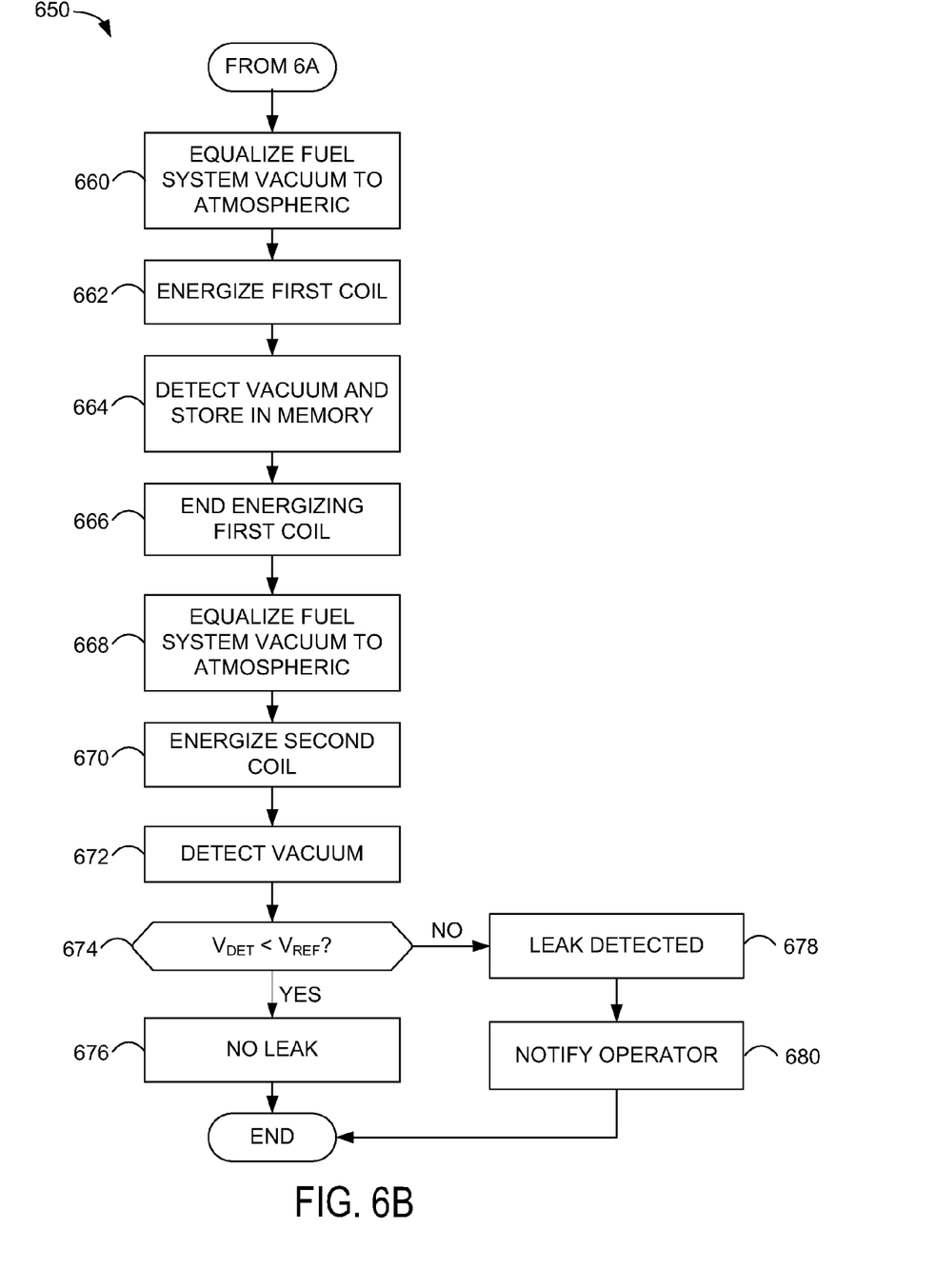
FIG. 6B depicts an example leak detection method according to another embodiment of the present disclosure.

FIGS. 6A and 6B are flow charts of the diagnostic process for identifying a leak using the valve described in FIGS. 2-5. FIG. 6A depicts an example method 600 for detecting a leak in a fuel system. The method starts at step 610 with the control system 14 detecting if the ignition key has been switched off. If yes, the method proceeds to step 612. If no, the method starts over. At step 612, the pressure inside the fuel system is equalized with atmospheric pressure by operating the valve 108 in its default, non-energized neutral starting position 218. Next, the first coil 214 is energized and the valve moves to its reference position 418 at 514. After a predetermined time period, the pressure in the fuel system will build until it stabilizes. At step 616, the reference pressure can be detected by pressure sensor 120 and stored in the control system 14. In this embodiment, the method is performed immediately following key-off, and thus heat from the catalyst and exhaust pipe, for example, is rejected into the fuel tank and causes the fuel in the tank to evaporate, increasing pressure in the fuel system above atmospheric levels. However, in an alternate embodiment, pressure could be introduced by an alternate mechanism, such as a pressure pump. Any suitable method to introduce pressure in the system could be used. After the pressure sensor detects the pressure while the valve is in the reference position, the first coil 214 is de-energized at 618. The valve is then back in its default neutral starting position 218, and the pressure in the system equalizes to atmospheric pressure at 620. The second coil 216 is energized at 622, moving the valve to its test position 518. Pressure is allowed to build until the pressure level stabilizes, and then the pressure sensor detects the pressure value at step 624. At 626 the detected pressure ($P_{det}$) from step 616 is compared to the reference pressure ($P_{ref}$) from step 624. If $P_{det}$ is greater than $P_{ref}$, it is determined no leak is present, and the test ends. However, if $P_{det}$ is not greater than $P_{ref}$, a leak is identified, and the method proceeds to 6B.

FIG. 6B depicts an example method 650 for detecting a leak in a fuel system using detected vacuum. If it is determined at step 626 that a leak is detected, method 650 is performed to provide a second indication of whether a leak is present, in order to reduce false positives. At step 660, the valve 108 is put into its default neutral starting position 218 by de-energizing coils 214 and 216. The fuel vapors that had accumulated in the fuel system during the steps of method 600 will have started to condense, as the temperature in the fuel tank drops. Therefore, the pressure in the fuel system will be lower than atmospheric and a vacuum will result. By positioning the valve in its starting position at 660, the pressure will equalize with atmospheric pressure. Next, at step 662 first coil 214 is energized and the valve moves to the reference position 418. Once the vacuum level stabilizes, the amount of pressure in the system is detected at step 664 by the pressure sensor and stored in the control system as the reference vacuum ($V_{ref}$). The valve is then moved back to the neutral position by de-energizing coil 214 at 666. The pressure is again equalized to atmospheric pressure at step 668 and then the second coil 216 is energized and the valve is moved to the test position 518 at 670. After the pressure level stabilizes, the pressure sensor senses the detected vacuum value ($V_{det}$) at 672. Next, $V_{det}$ is compared to $V_{ref}$ at 674. If $V_{det}$ is less than $V_{ref}$, no leak is detected and the test ends. If $V_{det}$ is not less than $V_{ref}$, a leak is indicated at 678, and a notification is sent at 680 to the vehicle operator.

The above-described methods can be carried out in a simplified manner due to the distribution of the ports along the valve, which enables a streamlined process for identifying leaks in the system. Because the first port is located intermediate to the second and third ports, the order of operating the valve in the first, second, first, third, and first positions as specified by the methods described above, brings the valve back into the starting position before and after operation in the second and third positions. This allows the pressure in the system to equalize with atmospheric between obtaining the reference and detected values. As a result, each pressure value sensed by the pressure sensor can be isolated away from the last pressure value obtained. By resetting the pressure level between each measurement, any error that might be introduced by transitioning from the reference position to the test position can be minimized. In this way, the pressure sensor can be "recalibrated" back to atmospheric between each reading, eliminating background noise and increasing sensitivity of the measurements. Furthermore, by providing equalization back to atmospheric pressure before and after the reference and test modes, a known pattern of atmospheric, reference, atmospheric, test and atmospheric pressure levels are observed, and therefore any errors in transitioning between the various operating positions may be easily detected.

In addition, the valve is automatically brought back into the neutral position when one of the two coils is de-energized. Because the neutral position is the default, non-energized state of the valve, equalization of the pressure back to atmospheric happens automatically, thus simplifying the controls needed to obtain each pressure value.

Figure 7:
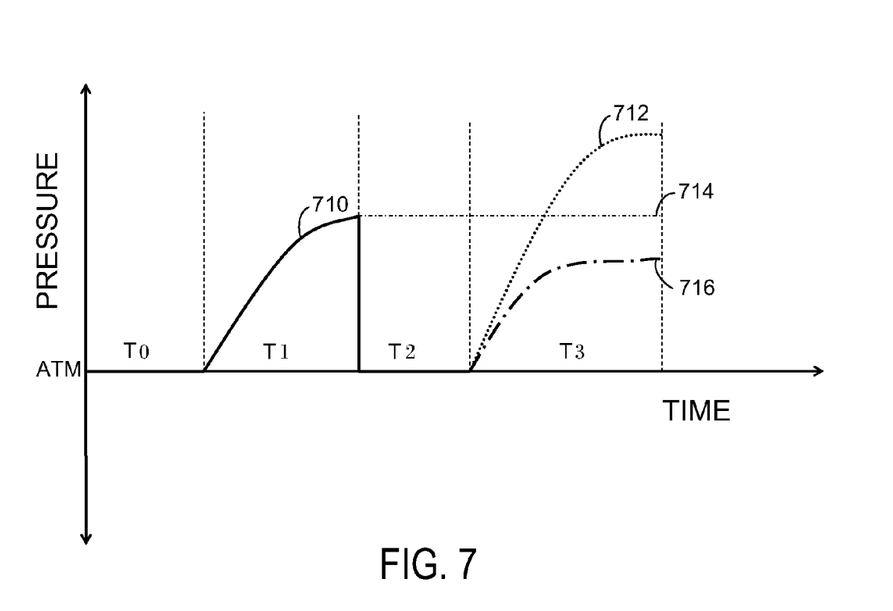
FIG. 7 shows an example timing scheme and detected pressure according to the method of FIG. 6A.
Figure 8:
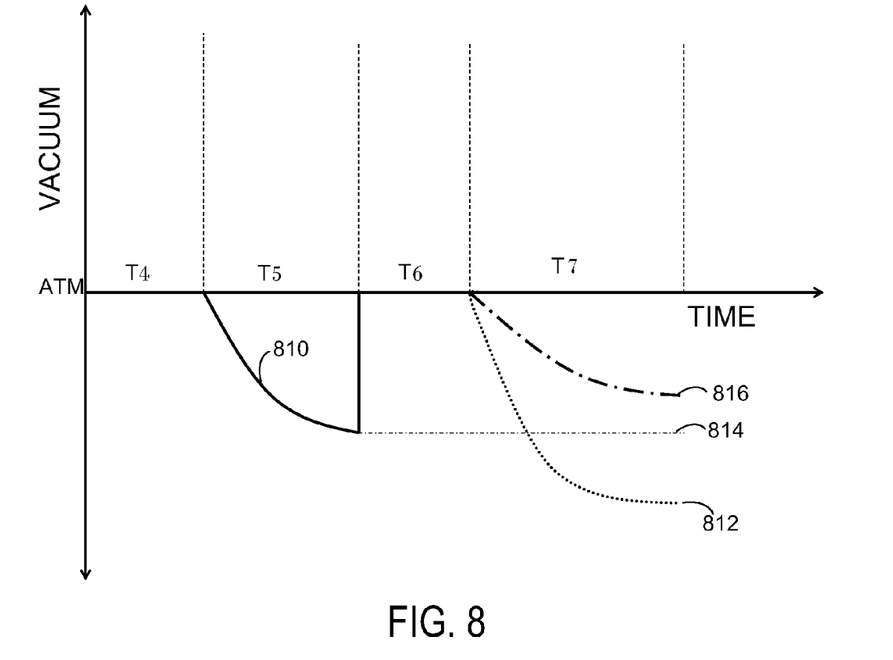
FIG. 8 shows an example timing scheme and detected vacuum according to the method of FIG. 6B.

FIGS. 7 and 8 schematically show example timings and pressure levels for the leak detection methods 600 and 650. FIG. 7 shows example pressure levels obtained while operating method 600. At T0, the pressure level is equalized to atmospheric due to the valve being in its starting position 218, wherein the canister is open to the atmosphere. Pressure equalization can be determined by comparing a first pressure value obtained by an emissions control system pressure sensor to a second pressure value obtained by an atmospheric pressure sensor, for example. Once the two pressure values are equal, atmospheric pressure has been obtained and the leak detection test may begin. At T1, the valve has been moved to the reference position 418, thereby coupling the reference port of the valve to the canister. The emissions control system is substantially blocked from the atmosphere, as only the reference orifice is open to the atmosphere. Therefore, due to fuel evaporation as a result of heat generated during previous operation of the engine, pressure builds in the system. Once the pressure level stabilizes, as determined by the emissions control system pressure sensor, a pressure value can be obtained. This pressure value is the reference pressure value and is used as the dynamically detected pass/fail threshold level for identifying a leak, and is depicted as dashed line 714. Next at T2, the valve is moved back to the starting position 218 and the pressure again equalizes with atmospheric, as the emissions control system is coupled to the atmosphere. The pressure signals obtained at T0, T1, and T2 are shown in FIG. 7 as solid line 710. At T3, the valve is moved to the test position 518, wherein the test port is coupled to the canister. Here, two example scenarios are depicted. First, dashed line 712 shows an example pressure level that stabilizes at a value above the pass/fail threshold, which was set by the reference position at T1 and is indicated by dashed line 714. Because the level is above that of the reference value, no leak is detected; the pressure was able to build to a level greater than that achieved by the reference orifice. Dashed line 716, on the other hand, shows an example pressure value that is at a level below the pass/fail threshold, indicating a leak is present. The time periods T0, T1, T2, and T3 may vary based on conditions such as barometric pressure, ambient temperature, and engine temperature, for example. Alternatively, the time periods may be predetermined.

To verify the detected leak, method 650 can be preformed. FIG. 8 shows example timings and vacuum levels obtained while operating this method. Method 650 may be carried out after sufficient time has passed following key-off to allow the engine to cool and fuel vapors in the system to begin to evaporate, causing pressure in the emission control system to be less than atmospheric. This timing may be based on conditions such as engine temperature and barometric pressure, or may be determined by comparing the pressure of the emissions control system to atmospheric before initiating the method. Similar to FIG. 7, the vacuum achieved while operating in the starting position 218 and reference position 418 are depicted by a solid line 810. At T4, the valve is in the starting position 218 and the vacuum in the system is equalized with atmospheric due to the valve being in the default position with the purge port coupled the canister, thus coupling the emission control system to the atmosphere. Next, the valve is moved to the reference position 418, coupling the canister to the reference port, and the vacuum value obtained while in the reference position is shown at T5. The valve is moved back to the starting position 218 and the vacuum again equalizes with atmospheric at T6. Finally, at T7, the valve is moved to the test position 518, coupling the canister with the test port. If no leak is detected, the detected value will be less than the reference value 814, as shown by dashed line 812. If a leak is present, the detected vacuum will be greater than the reference value, as shown by dashed line 816. Again, the time periods T4, T5, T6, and T7 may vary based on conditions such as barometric pressure, ambient temperature, and engine temperature, for example. Alternatively, the time periods may be predetermined.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and nonobvious combinations and subcombinations of the various systems and configurations, and other features, functions, and/or properties disclosed herein.

The invention claimed is:

1. A method controlling an emissions control system coupled to an internal combustion engine, the emissions control system including a vapor recovery line fluidically coupling a fuel tank to a hydrocarbon filter element, a vent line positioned between the hydrocarbon filter element and atmosphere, a valve having a first, second, and third connection port, the valve arranged within the vent line between the hydrocarbon filter element and a fresh air filter arranged on the atmosphere side of the vent line, the method comprising:

during a first operating mode, routing vapors from the hydrocarbon filter element through the valve to the atmosphere via the first port with the valve in a first position;

during a second operating mode, routing vapors from the hydrocarbon filter element through the valve to the atmosphere via the second port with the valve in a second position, the second port comprising a leak reference orifice; and during a third operating mode, storing vapors in the hydrocarbon filter element and the fuel tank, wherein the valve is fluidically coupled to the hydrocarbon filter element via the third port with the valve in a third position.

2. The method of claim 1, wherein the leak reference orifice comprises a leak hole within the second port, a size of the hole set to a predetermined reference value.

3. The method of claim 1, wherein the first connection port is located intermediate to the second and third connection ports on the valve.

4. The method of claim 1, further comprising:
during the first operating mode, equalizing pressure in the emissions control system with atmospheric pressure while the valve is in the first position;
during the second operating mode, obtaining a reference pressure value from a pressure sensor coupled to the emissions control system with the valve in the second position; and
during the third operating mode, indicating a leak when a detected pressure value with the valve in the third position is not greater than the reference pressure value, the detected pressure value obtained from the pressure sensor.

5. The method of claim 4, wherein the internal combustion engine is not running and pressure in the emissions control system is generated by evaporation of fuel in the fuel tank due to heat generated by a previous operation of the internal combustion engine being rejected into the fuel tank.

6. The method of claim 1, further comprising:
during a fourth operating mode, routing fresh air from the atmosphere through the valve to the hydrocarbon filter element via the first port with the valve in the first position; and
during a fifth operating mode, routing fresh air from the atmosphere through the valve to the hydrocarbon filter element via the second port with the valve in the second position.

7. The method of claim 6, wherein the fourth operating mode further comprises a canister purge valve being in an open position, the canister purge valve coupled between the hydrocarbon filter element and the internal combustion engine, and wherein the internal combustion engine is running.

8. The method of claim 6, further comprising:
during the fourth operating mode, equalizing pressure in the emissions control system with atmospheric pressure while the valve is in the first position;
during the fifth operating mode, obtaining a reference pressure value from a pressure sensor coupled to the emissions control system with the valve in the second position; and
during the fourth mode, equalizing pressure in the emissions control system with atmospheric pressure while the valve is in the first position; and during the third operating mode, indicating a leak when a detected pressure value with the valve in the third position is not less than the reference pressure value, the detected pressure value obtained from the pressure sensor.

9. The method of claim 8, wherein the internal combustion engine is not running and pressure in the emissions control system is produced by condensation of fuel vapors due to cooling of the fuel tank.

10. A method for controlling an emissions control system coupled to an internal combustion engine, the emissions control system including a vapor recovery line fluidically coupling a fuel tank to a hydrocarbon filter element, a vent line positioned between the hydrocarbon filter element and atmosphere, a valve having a first, second, and third operating position, the valve arranged within the vent line between the hydrocarbon filter element and a fresh air filter arranged on the atmosphere side of the vent line, the method comprising:
equalizing pressure in the emissions control system with the atmosphere while the valve is in the first operating position;
setting a leak reference value based on a pressure value while the valve is in the second operating position, the second operating position located in a first direction away from the first operating position;
equalizing pressure in the emissions control system with the atmosphere while the valve is back in the first operating position;
obtaining a detected leak value based on a pressure value while the valve is in the third operating position, the third operating position located in a second direction away from the first operating position, the second direction being opposite from the first direction; and
identifying that the emissions control system has a leak based on a level of the detected leak value relative to the leak reference value.

11. The method of claim 10, wherein:
the first operating position further comprises the hydrocarbon filter element being open to the atmosphere via a first, open port of the valve;
the second operating position further comprises the hydrocarbon filter element being open to the atmosphere via a second, reference orifice port of the valve; and
the third operating position further comprises the hydrocarbon filter element being closed to the atmosphere via a third, closed port of the valve.

12. The method of claim 10, wherein the pressure values are higher than atmospheric and the leak is identified based on the detected leak value not being greater than the leak reference value.

13. The method of claim 10, wherein the pressure values are lower than atmospheric and the leak is identified based on the detected leak value not being less than the leak reference value.

14. The method of claim 11, further comprising setting a second leak reference value and a second detected leak value based on second pressure values, and wherein the second pressure values are lower than atmospheric and the leak is detected based on both the detected leak value not being greater than the leak reference value and the second detected leak value not being less than the second leak reference value.

15. The method of claim 10, wherein the method is performed following a key-off condition of the internal combustion engine and wherein pressure greater than atmospheric is produced by evaporation of fuel in the fuel tank due to heat generated by a previous operation of the internal combustion engine being rejected into the fuel tank.

16. The method of claim 10, wherein pressure less than atmospheric is produced by condensation of fuel vapors due to cooling of the fuel tank.

* * * * *